United States Patent [19]

Flasz

[11] Patent Number: 5,457,286
[45] Date of Patent: Oct. 10, 1995

[54] FACE PLATE ASSEMBLY FOR ELECTRICAL RECEPTACLE

[76] Inventor: Igor Flasz, Centro Plaza, Torre A Piso 9 Avenida, Francisco De Miranda Caracas, Venezuela

[21] Appl. No.: 808,173

[22] Filed: Dec. 13, 1991

[51] Int. Cl.$^6$ ........................................ H02G 3/14
[52] U.S. Cl. ............................ 174/66; 200/339; 439/536
[58] Field of Search .................. 174/53, 66, 67; 220/241; 200/333, 339; 439/536, 538; D8/350–353

[56] References Cited

U.S. PATENT DOCUMENTS

| | | | |
|---|---|---|---|
| 2,515,932 | 7/1950 | Stang et al. | 200/167 |
| 2,740,873 | 4/1956 | Cronk | 200/168 |
| 2,794,890 | 6/1957 | Taylor | 200/172 |
| 2,988,242 | 6/1961 | Kneip | 174/67 X |
| 3,306,185 | 5/1962 | Wiley et al. | 200/172 |
| 3,335,248 | 8/1967 | Bassani | 174/53 X |
| 3,437,737 | 4/1969 | Wagner | 174/55 |
| 3,437,738 | 4/1969 | Wagner | 174/55 |
| 4,289,921 | 9/1981 | Gartner et al. | 174/67 X |
| 4,359,619 | 11/1982 | Bergoltz | 200/333 |
| 5,036,168 | 7/1991 | Kikuchi | 174/53 X |

FOREIGN PATENT DOCUMENTS 1173962  7/1964  Germany.

*Primary Examiner*—Leo P. Picard
*Assistant Examiner*—David Tone
*Attorney, Agent, or Firm*—Malloy & Malloy

[57] ABSTRACT

A face plate assembly, to be decoratively and functionally secured over an electrical switch or output source, the assembly including a frame structure having at least one opening in a flat central area thereof which is structured and disposed to surroundingly engage an electricity control casing protruding therethrough, and a plurality of decorative key plates, each having a pair of protruding pegs structured and disposed to be snugly, yet removably fitted into correspondingly positioned protruding apertures in the frame structure, and at least one utility key plate having a pair of protruding pegs positioned so as to correspondingly position the utility key plate over the electricity control casing and being structured to enable an electricity control within the electricity control casing to be functional.

11 Claims, 3 Drawing Sheets

5,457,286

FACE PLATE ASSEMBLY FOR ELECTRICAL RECEPTACLE

BACKGROUND OF THE INVENTION

1. Field of the Invention

This invention relates to a face plate assembly adapted to provide a decorative and highly functional electricity control cover having a uniform and attractive exterior surface, thereby providing its user with a decorative, highly visible, highly safe and attractively contoured electricity control covering means.

2. Description of the Prior Art

Electricity control covers are a commonly seen and utilized article in any room. They are of great necessity because they conceal potentially harmful electrical switch or output sources while allowing them to remain functional. Throughout the art, there are numerous designs of electricity control covers, but all have a few common characteristics. These characteristics include the use of a cover plate with a protruding switch portion extending therethrough which is utilized, and the unavailability of changing the color or design of the plate without completely removing the plate and exposing the potentially hazardous electrical control. Accordingly, there is still a need for an attractive and functional electricity control cover, which while providing a uniform and easily variable exterior face, is also very safe in that a frame structure will remain in constant covering relation over the electricity controls when varying the exterior appearance of the assembly to conform and/or highlight any room.

Applicant's invention is designed precisely to overcome the decorative and safety difficulties of prior assemblies, as well as provide an effective and easy to use means of having an easily variable segmented cover area.

SUMMARY OF THE INVENTION

The present direction is directed towards a face plate assembly including a frame structure and a plurality of key plates defining an attractive and easily interchangeable cover plate. The frame structure is sized and configured to sufficiently cover a wall opening containing an electrical switch or output source and includes at least one opening in a flat central area thereof which is structured and disposed to surroundingly engage an electricity control casing protruding therethrough. Further included about the periphery of the frame structure are a plurality of protruding apertures. Each of the plurality of key plates includes a pair of protruding pegs extending from a rear face thereof, which are structured and disposed to be snugly, yet removably fitted into corresponding ones of said apertures in said frame structure, thereby allowing the key plates to be varied and interchanged when desired. In addition to the standard key plates is at least one utility key plate. The utility key plate includes a pair of protruding pegs positioned so as to correspondingly position the utility key plate over the electricity control casing protruding through the frame structure. The utility key plate, which may either be a switch plate or an outlet plate, also contains means to enable the electricity control within the electricity control casing to be functional. Finally, means to secure the frame structure over the wall opening are provided such that the frame structure need not be removed when varying the exterior cover plate.

BRIEF DESCRIPTION OF THE DRAWINGS

For a fuller understanding of the nature of the present invention, reference should be had to the following detailed description taken in connection with the accompanying drawings, in which.

Like reference numerals refer to like parts throughout the several views of the drawings.

DETAILED DESCRIPTION OF THE PREFERRED EMBODIMENT

As shown throughout FIGS. 1–6, the present invention is directed towards a face plate assembly, generally indicated as 10, to be positioned over a wall opening for an electrical switch 62 or output source 70.

Figure 1:
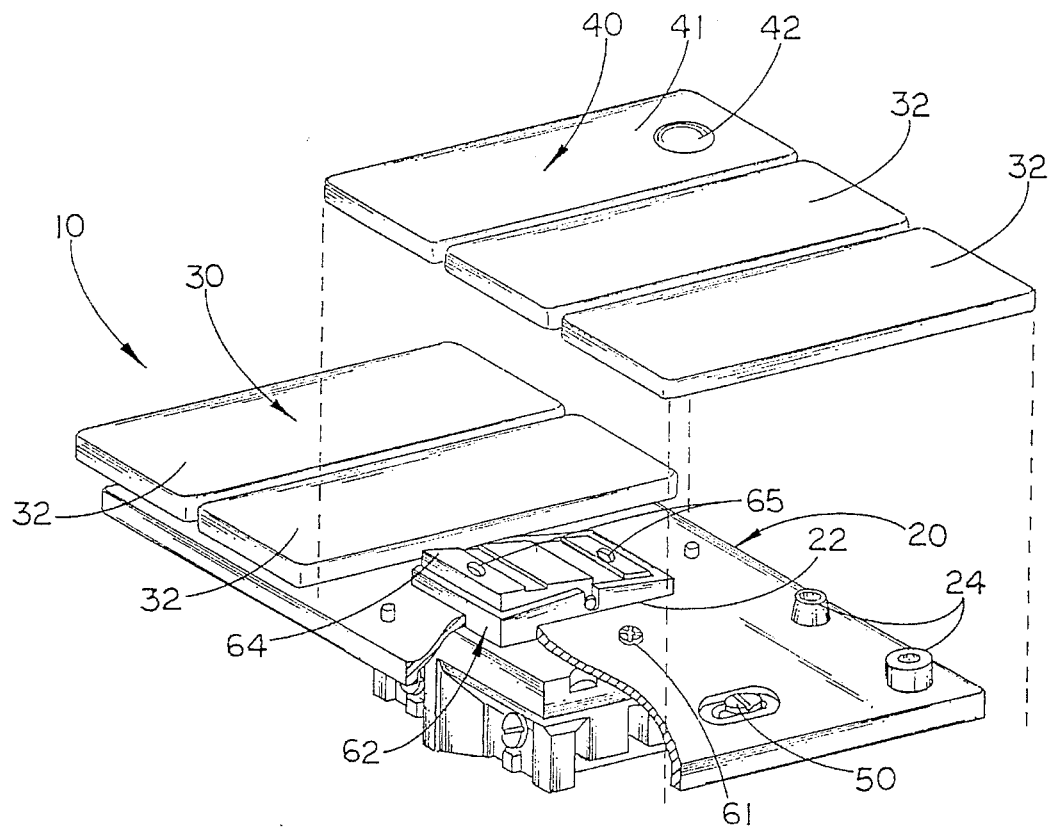
FIG. 1 is a perspective, partial cutaway view of the face plate assembly.
Figure 2:
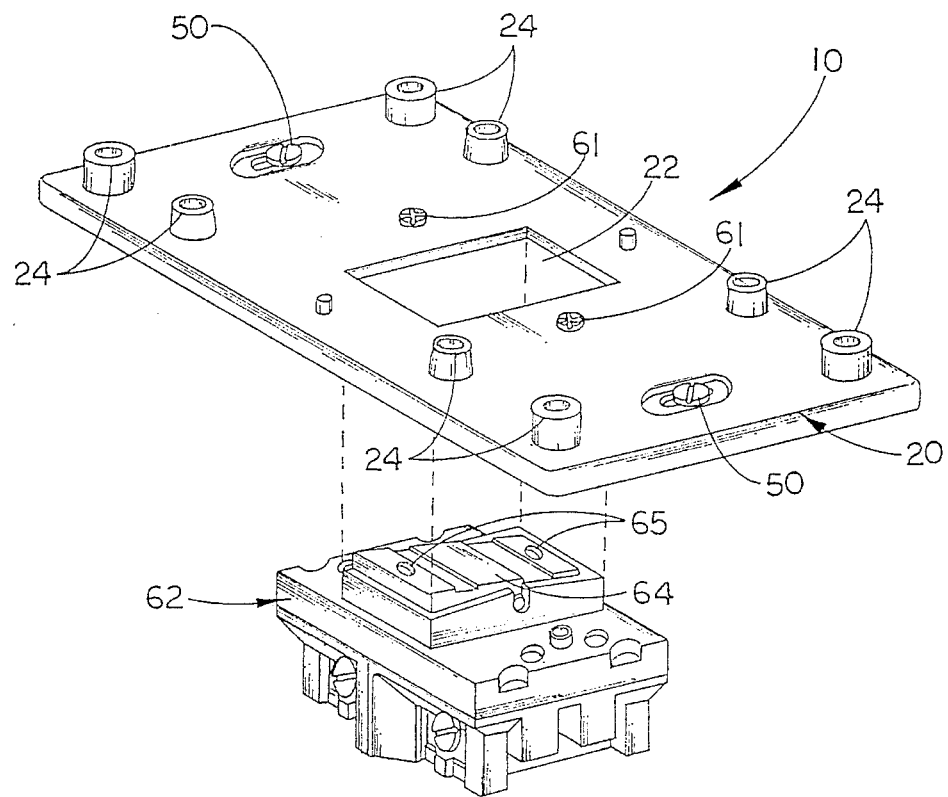
FIG. 2 is an exploded perspective view of the frame structure of the face plate assembly.
Figure 3:
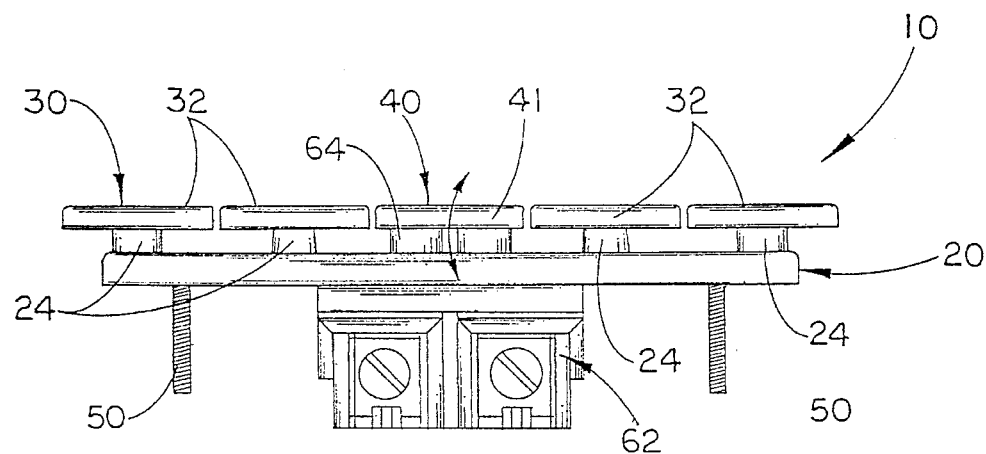
FIG. 3 is a side view of the face plate assembly.
Figure 4:
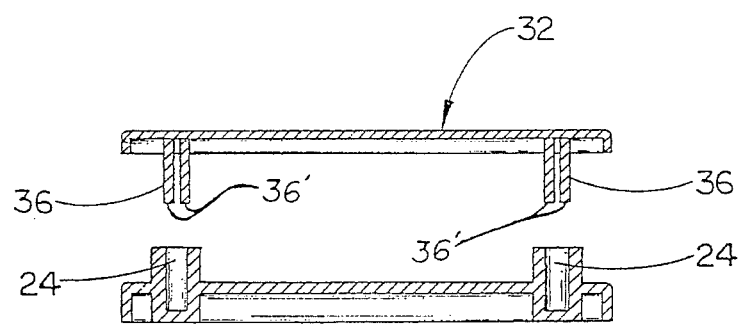
FIG. 4 is a cross-sectional view of a key plate and corresponding protruding apertures.

Turning to FIGS. 1–3, the face plate assembly 10 primarily includes a frame structure 20, and a cover plate 30 defined by a plurality of key plates 32 and at least one utility key plate 40. The frame structure 20, as best shown in FIG. 2, includes an opening 22 through which a protruding switch portion 64 of an electrical switch 62 may pass. The electrical switch 62 is secured to the frame structure by a pair of screws 61 on opposite sides of the opening 22. Further disposed at opposite distal ends of the frame structure are elongate screws 50 which secure the frame structure 20 to a wall.

About the periphery of the frame structure 20 are a plurality of protruding apertures 24. The protruding apertures 24 are structured and disposed to receive in snug fitting relation therein a pair of pegs 36, best seen in FIG. 4, which extend from each key plate 32 and provide a secure fit when positioned within the protruding apertures 24. Each peg 36 is made of two semi-circular halves 36' which must compress when being inserted into the apertures 24, thereby providing the snug fit. Positionable over the protruding switch portion 64 of the electrical switch 62 is a switch plate 41 which also includes a 15, pair of protruding pegs 36. The protruding pegs 36 are structured and disposed to be snugly fitted into a pair of apertures 65 in the protruding switch portion 64 of the electrical switch 62. The switch plate 41 includes a contoured recess 42 to facilitate the identification of the utility plate 40, and as seen in FIG. 3, the switch plate 41 pivots causing the protruding switch portion 64 of the electrical switch 62 to pivot between an on and off position.

Figure 5:
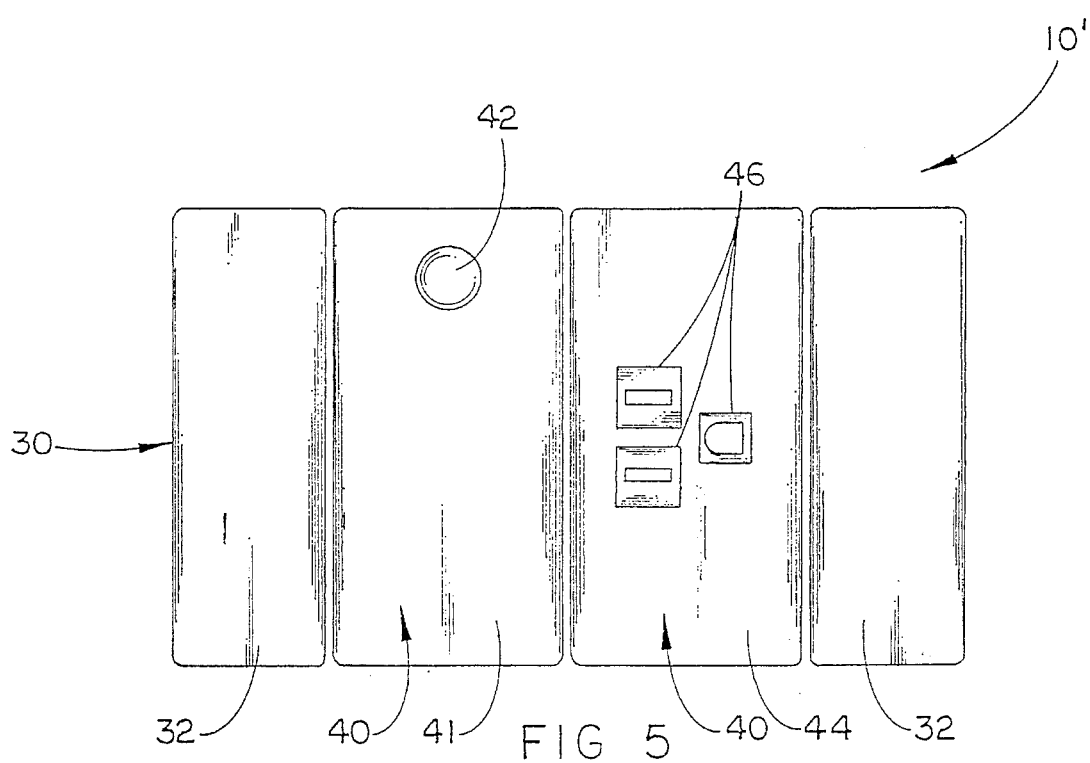
FIG. 5 is an overhead view of a second embodiment of the face plate assembly.
Figure 6:
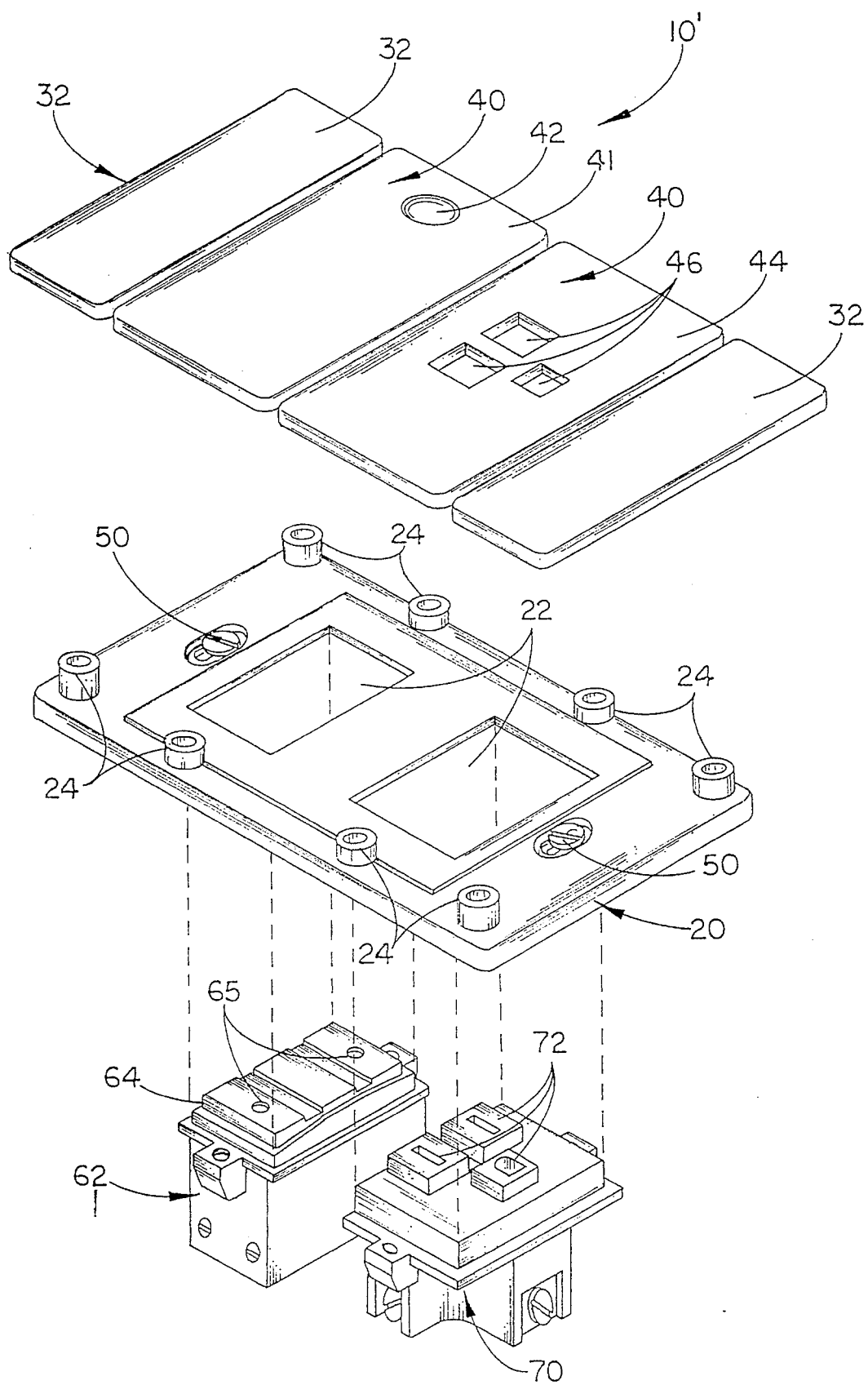
FIG. 6 is an exploded view of the second embodiment of the face plate assembly.

Turning to FIGS. 5 and 6, and a second embodiment of the face plate assembly 10', the face plate assembly 10' may include a plurality of utility plates 40. As shown, in addition to a switch plate 41, an outlet plate 44 may be included to be positioned over an output source 70. The outlet plate 44 includes a plurality of apertures 46 therein to receive therethrough the protruding plug receptacles 72 of the output source 70. Accordingly, all internal portions of the output source 70 are safely contained behind the outlet plate 44.

The cover plate portion 30 may have a variety of colors and designs, and provides a smooth, aesthetically appealing surface. Further, individual key plates 32 are quickly and easily interchangeable to vary the exterior design of the cover plate 30.

Now that the invention has been described,

What is claimed is:

1. An electrical wiring device and cover plate assembly adapted to be electrically connected within an electrical box in a wall, said assembly comprising:

a frame structured and configured for attachment with an open end of the electrical box in substantially covering relation to the electrical box and a surrounding wall surface, and including a substantially planar front and rear surface and at least one central opening having a surrounding peripheral border, said frame structure further including a plurality of protruding apertures disposed about the periphery of said front surface thereof, an electrical device casing including a front face having a protruding, operable portion including surrounding sides extending outwardly from said front face, said front face including a substantially flat surface surrounding said operable portion and being structured and disposed for mating engagement with said rear surface of said frame for attachment of said electrical device thereto, such that said operable portion protrudes through said central opening with said peripheral border disposed in close, surrounding relation to said sides of said operable portion, a plurality of substantially rectangular key plates structured and disposed for removable attachment in covering relation to said frame and operable portion so as to define a cover plate providing an aesthetically pleasing external appearance to the assembly, attachment means for removable, individual attachment of each of said plurality of key plates in covering relation to the frame, including a pair of spaced apart pegs extending from a rear surface of each of said plurality of key plates and being structured and disposed for snug, yet removable receipt within corresponding ones of said protruding apertures, at least one utility plate including a pair of attachment pegs protruding from a rear surface thereof being structured and disposed to facilitate removable attachment of said utility plate in substantially covering relation to said operable portion of said electrical device casing, and said utility plate including means thereon to facilitate operation of said operable portion.

2. An assembly as recited in claim 1 wherein said electrical device casing includes an electrical outlet casing.

3. An assembly as recited in claim 2 wherein said operable portion includes an electrical outlet having a plurality of outlet openings structured and disposed for receipt of a male end of an electrical plug therein.

4. An assembly as recited in claim 3 wherein said utility plate includes an outlet plate structured for removable attachment over said electrical outlet.

5. An assembly as recited in claim 4 wherein said means to facilitate operation of said operable portion includes a plurality of cutout portions sized and disposed to receive said electrical outlet therethrough so as to expose said outlet openings.

6. An assembly as recited in claim 1 wherein said electrical device casing includes an electrical switch casing.

7. An assembly as recited in claim 6 wherein said operable portion includes an electric light switch.

8. An assembly as recited in claim 7 wherein said utility plate includes a switch plate structured for removable attachment to said electric light switch and being movable therewith, such that forced movement of said switch plate causes said electric light switch to be moved between an on position and an off position.

9. An assembly as recited in claim 8 wherein said means to facilitate operation of said operable portion includes a recessed, circular dimple in an exposed front surface of said switch plate.

10. An electrical wiring device and cover plate assembly adapted to be electrically connected within an electrical box in a wall, said assembly comprising:

a frame structured and configured for attachment with an open end of the electrical box in substantially covering relation to the electrical box and a surrounding wall surface, and including a substantially planar front and rear surface and at least one central opening having a surrounding peripheral border, an electrical outlet casing including a front face having a protruding, operable portion including surrounding sides extending outwardly from said front face, said front face including a substantially flat surface surrounding said operable portion and being structured and disposed for mating engagement with said rear surface of said frame for attachment of said electrical outlet casing thereto, such that said operable portion protrudes through said central opening with said peripheral border disposed in close, surrounding relation to said sides of said operable portion, said operable portion of said electrical outlet casing including an electrical outlet having a plurality of protruding outlet openings structured and disposed for receipt of a male end of an electrical plug therein, a plurality of substantially rectangular key plates structured and disposed for attachment in covering relation to said frame and operable portion so as to define a cover plate providing an aesthetically pleasing external appearance to the assembly, attachment means for removable, individual attachment of each of said plurality of key plates in covering relation to the frame, said plurality of key plates including at least one outlet plate structured for removable attachment over said electrical outlet, and said outlet plate including a plurality of cutout portions sized and disposed to receive said protruding outlet openings therethrough so as to expose said outlet openings.

11. An electrical wiring device and cover plate assembly adapted to be electrically connected within an electrical box in a wall, said assembly comprising:

a frame structured and configured for attachment with an open end of the electrical box in substantially covering relation to the electrical box and a surrounding wall surface, and including a substantially planar front and rear surface and at least one central opening having a surrounding peripheral border, an electrical switch casing including a front face having a protruding, operable portion including surrounding sides extending outwardly from said front face, said front face including a substantially flat surface surrounding said operable portion and being structured and disposed for mating engagement with said rear surface of said frame for attachment of said electrical switch casing thereto, such that said operable portion protrudes through said central opening with said peripheral border disposed in close, surrounding relation to said sides of said operable portion, said operable portion of said electrical switch casing including an electric light switch, a plurality of substantially rectangular key plates structured and disposed for attachment in covering relation to said frame and operable portion so as to define a cover plate providing an aesthetically pleasing external appearance to the assembly, attachment means for removable, individual attachment of each of said plurality of key plates in covering relation to the frame, said plurality of key plates including at least one switch plate structured for removable attachment to said electric light switch and being movable therewith, such that forced movement of said switch plate causes said electric light switch to be moved between an on position and an off position, and said switch plate including means thereon to facilitate operation of said electric light switch including a recessed, circular dimple in an exposed front surface thereof.

* * * * *